United States Patent
Born et al.

(10) Patent No.: US 12,523,404 B2
(45) Date of Patent: Jan. 13, 2026

(54) RETROFIT FOR FAN CONTROL IN REFRIGERATED CASES

(71) Applicant: Copeland LP, Sidney, OH (US)

(72) Inventors: Jason A. Born, Cincinnati, OH (US);
Kory M. Place, Sidney, OH (US);
Damiel A. Faxon, Sydney, OH (US);
James S. Fraser, Springboro, OH (US)

(73) Assignee: Copeland LP, Sidney, OH (US)

( * ) Notice: Subject to any disclaimer, the term of this patent is extended or adjusted under 35 U.S.C. 154(b) by 116 days.

(21) Appl. No.: 18/421,197

(22) Filed: Jan. 24, 2024

(65) Prior Publication Data

US 2024/0247848 A1 Jul. 25, 2024

Related U.S. Application Data (60) Provisional application No. 63/441,014, filed on Jan. 25, 2023.

(51) Int. Cl.
*F25B 49/02* (2006.01)
*F25B 49/00* (2006.01)

(52) U.S. Cl.
CPC ...... *F25B 49/005* (2013.01); *F25B 2500/222* (2013.01)

(58) Field of Classification Search
CPC .... F24F 11/36; F25B 49/005; F25B 2500/222
See application file for complete search history.

(56) References Cited

U.S. PATENT DOCUMENTS

| | | | |
|---|---|---|---|
| 4,748,355 A * | 5/1988 | Anderson | H02K 5/225 310/71 |
| 5,293,771 A | 3/1994 | Ridenour | |
| 5,398,251 A | 3/1995 | Shim | |
| 6,209,338 B1 | 4/2001 | Thatcher, Jr. | |
| 6,553,774 B1 | 4/2003 | Ishio et al. | |
| 6,772,598 B1 | 8/2004 | Rinehart | |
| 6,782,706 B2 | 8/2004 | Holmes et al. | |
| 8,132,419 B2 | 3/2012 | Yonemori et al. | |
| 8,215,121 B2 | 7/2012 | Yoshimi et al. | |

(Continued)

FOREIGN PATENT DOCUMENTS

| | | |
|---|---|---|
| CA | 2990975 A1 | 1/2017 |
| EP | 719995 A2 | 7/1996 |

(Continued)

*Primary Examiner* — Jonathan Bradford
(74) *Attorney, Agent, or Firm* — Harness, Dickey & Pierce, P.L.C.; Anthony G. Fussner (57) ABSTRACT

A refrigerant leak detection system includes a leak sensor module for sensing leaked refrigerant and a universal connector. The universal connector is configured as a junction for connecting an AC voltage source with the leak sensor module and an evaporator fan of a refrigerated case. The universal connector is configured to be operable for selectively supplying AC voltage from the AC voltage source to the evaporator fan, or to the leak sensor module, or to both the evaporator fan and the leak sensor module. When the leak sensor module is activated to conduct leak testing, the AC voltage from the AC voltage source to the evaporator fan is interrupted by the universal connector to thereby turn OFF the evaporator fan and facilitate detection of any leaked refrigerant.

30 Claims, 3 Drawing Sheets

(56) References Cited

U.S. PATENT DOCUMENTS

| | | |
|---|---|---|
| 8,274,233 B2 | 9/2012 | Altonen et al. |
| 8,280,557 B2 | 10/2012 | Kawano et al. |
| 8,393,169 B2 | 3/2013 | Pham |
| 8,695,404 B2 | 4/2014 | Kadle et al. |
| 8,899,056 B2 | 12/2014 | Kawano et al. |
| 9,459,032 B2 | 10/2016 | Nishimura et al. |
| 9,513,043 B2 | 12/2016 | Keres et al. |
| 9,739,513 B2 | 8/2017 | Ochiai et al. |
| 9,869,499 B2 | 1/2018 | Liu et al. |
| 9,933,205 B2 | 4/2018 | Hatomura et al. |
| 10,113,763 B2 | 10/2018 | Ochiai et al. |
| 10,345,038 B2 | 7/2019 | Saunders et al. |
| 10,539,358 B2 | 1/2020 | Suzuki et al. |
| 10,794,611 B2 | 10/2020 | Suzuki et al. |
| 10,965,489 B2 | 3/2021 | Han et al. |
| 11,125,457 B1 | 9/2021 | Alfano et al. |
| 11,131,471 B1 | 9/2021 | Butler et al. |
| 11,609,032 B2 | 3/2023 | Butler et al. |
| 11,713,893 B2 | 8/2023 | Butler et al. |
| 11,732,916 B2 | 8/2023 | Butler et al. |
| 2005/0086952 A1 | 4/2005 | Nonaka et al. |
| 2006/0191323 A1 | 8/2006 | Garabedian et al. |
| 2008/0148751 A1 | 6/2008 | Swofford |
| 2009/0077983 A1 | 3/2009 | Singh et al. |
| 2013/0267120 A1 * | 10/2013 | Rothkopf .......... H01R 13/6683 439/620.21 |
| 2018/0292118 A1 | 10/2018 | Suzuki et al. |
| 2019/0063808 A1 | 2/2019 | Suzuki et al. |
| 2019/0170603 A1 | 6/2019 | Gupte et al. |
| 2019/0383509 A1 | 12/2019 | Takagi et al. |
| 2020/0033036 A1 | 1/2020 | Yamada et al. |
| 2020/0049361 A1 | 2/2020 | Minamida et al. |
| 2020/0248919 A1 | 8/2020 | Green et al. |
| 2021/0215413 A1 | 7/2021 | Deaville |
| 2021/0293430 A1 | 9/2021 | Yamada |
| 2021/0348820 A1 | 11/2021 | Kobayashi et al. |
| 2021/0356154 A1 | 11/2021 | Kobayashi et al. |
| 2021/0356155 A1 | 11/2021 | Yoshimi et al. |
| 2021/0356202 A1 | 11/2021 | Han et al. |
| 2021/0404685 A1 | 12/2021 | Butler et al. |
| 2022/0003471 A1 | 1/2022 | Welch |
| 2022/0042698 A1 | 2/2022 | Butler |
| 2022/0049883 A1 | 2/2022 | Alfano et al. |
| 2022/0099346 A1 | 3/2022 | Alfano et al. |
| 2022/0252291 A1 | 8/2022 | Alfano |
| 2022/0349600 A1 | 11/2022 | Alfano |
| 2023/0077481 A1 | 3/2023 | Hong et al. |
| 2023/0109334 A1 | 4/2023 | Welch et al. |

FOREIGN PATENT DOCUMENTS

| | | | |
|---|---|---|---|
| EP | 3633282 A1 | 4/2020 | |
| GB | 2555256 A * | 4/2018 | ............ F24F 11/65 |
| JP | 2003042631 A | 2/2003 | |
| JP | 2016200349 A | 12/2016 | |
| JP | 6112386 B2 | 4/2017 | |
| JP | 6176304 B2 | 8/2017 | |
| WO | WO-2021172866 A1 | 9/2021 | |

\* cited by examiner

RETROFIT FOR FAN CONTROL IN REFRIGERATED CASES

CROSS-REFERENCE TO RELATED APPLICATION

This application claims the benefit of and priority to U.S. Provisional Application No. 63/441,014 filed Jan. 25, 2023. The entire disclosure of the above application is incorporated herein by reference.

FIELD

The present disclosure relates to retrofit for fan control in refrigerated cases.

BACKGROUND

This section provides background information related to the present disclosure which is not necessarily prior art.

Refrigerant is heavier than air and will therefore settle at the lowest point when the refrigerant has leaked out of a refrigeration system. A common refrigerant leak point in a supermarket refrigeration system is within the refrigerated cases on the sales floor. This refrigerant leak location can be especially hard to find if the refrigerant leak is buried beneath fresh/frozen food. This can be problematic as refrigeration leaks throughout a refrigeration system impact system performance and may eventually result in product loss.

DRAWINGS

The drawings described herein are for illustrative purposes only of selected embodiments and not all possible implementations, and are not intended to limit the scope of the present disclosure.

Corresponding reference numerals may indicate corresponding (though not necessarily identical) parts throughout the several views of the drawings.

DETAILED DESCRIPTION

Example embodiments will now be described more fully with reference to the accompanying drawings.

A common refrigerant leak point in a supermarket refrigeration system is within the refrigerated cases on the sales floor. Because refrigerant is heavier than air, the leaked refrigerant will settle at the lowest point within the refrigerated case. The inventors hereof have recognized, however, that as a refrigerant leak happens, the operation of the fans from the evaporator coils will dilute the refrigerant leak within the case and prevent the leaked refrigerant from completely settling to the lowest point within the refrigerated case. But when the evaporator fans are turned off (e.g., even for less than two minutes, etc.), the leaked refrigerant will settle to the bottom of the refrigerated case. This settling of the refrigerant makes it easier for a refrigerant sensor to detect the leak.

But as further recognized herein, evaporator fans in Medium Temp (MT) refrigerated cases never turn OFF. And in Low Temp (LT) refrigerated cases, the evaporator fans turn OFF during defrost. And in most stores operating today, there is not a controller at each refrigerated case to control of the evaporator fans, lights, and valves within the refrigerated case. In these instances, the LT refrigerated case fans turn OFF during defrost through control of the electric panel. For pinpoint refrigerant leak detection, controlling the fan(s) is advantageous. But adding or retrofitting a new controller to an existing refrigerated case for controlling its evaporator fan(s) can be quite costly and invasive for a supermarket.

Accordingly, the inventors hereof have developed and/or disclosed herein exemplary embodiments of methods/retrofittable mechanisms for interrupting the power to the evaporator fans of existing refrigerated cases to thereby gain control of when to turn ON/OFF the evaporator fans.

As disclosed herein, exemplary embodiments include a universal connector configured to be positioned along an AC voltage supply line upstream of the evaporator fan(s), such that the universal connector intervenes and is disposed between the evaporator fan(s) and the AC voltage source. The universal connector is configured to be operable as a power interrupter for turning OFF the evaporator fan(s). The universal connector is controllably usable (e.g., via a wireless controller, etc.) for interrupting and stopping the AC voltage supply from reaching the evaporator fan(s) to thereby turn OFF the evaporator fan(s). By controllably interrupting the electrical power to the evaporator fan(s) via the universal connector, the evaporator fan(s) may be controllably turned OFF for a period of time (e.g., two minutes or less, etc.) such that dilution of the leaked refrigerant will cease and enough leaked refrigerant will accumulate in the bottom of the refrigeration case to meet detection thresholds.

Figure 1:
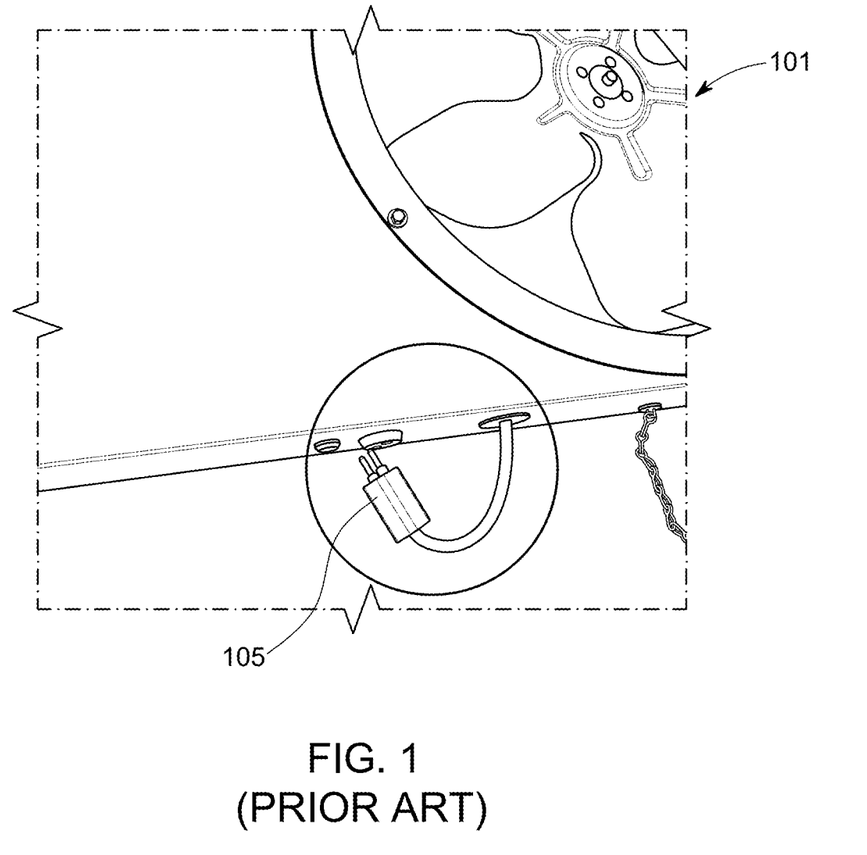
FIG. 1 shows a conventional evaporator fan including a two-prong plug/connector for easy install to a store's power.
Figure 3:
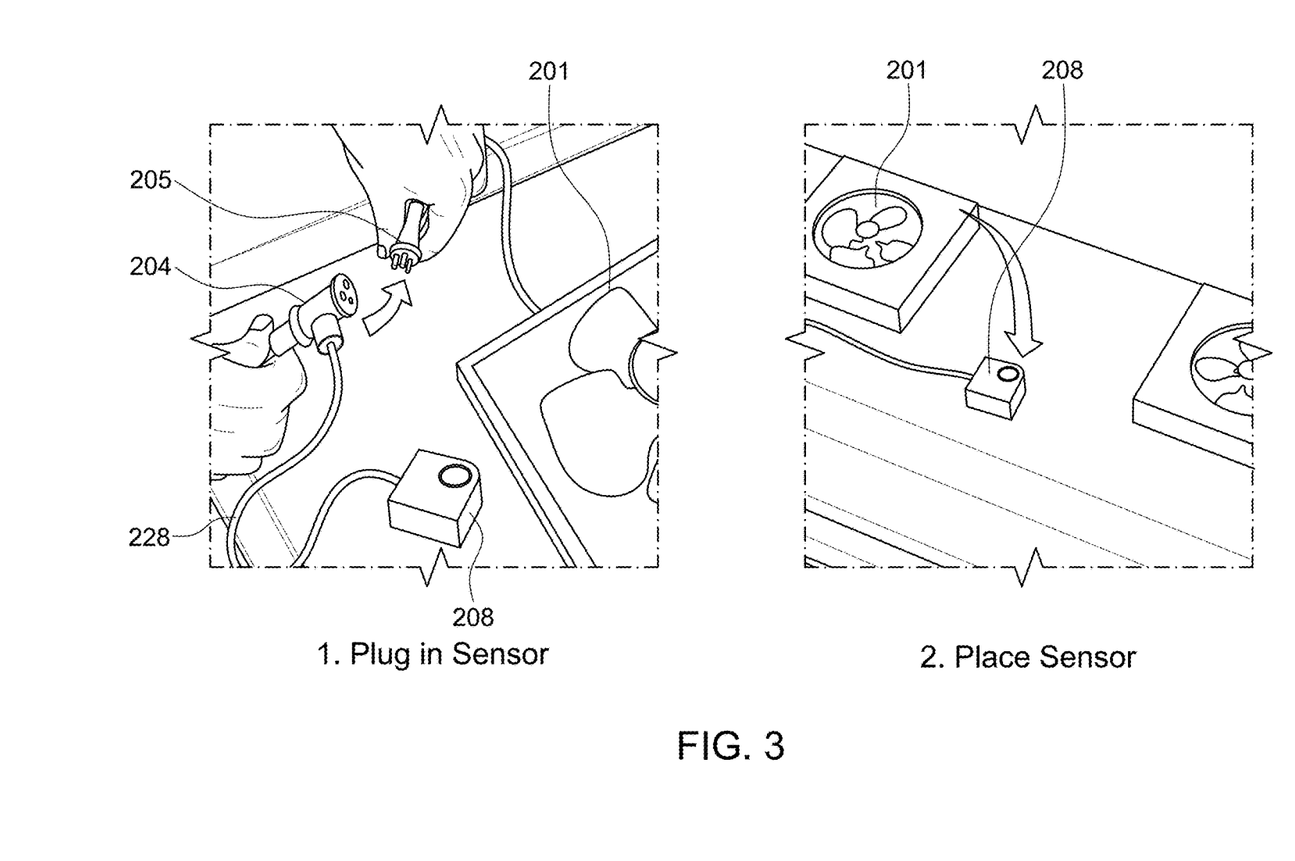
FIG. 3 shows a universal connector being retrofit or added to a refrigerated case to provide fan control during leak testing according to an exemplary embodiment of the present disclosure.

In addition, evaporator fans may have different types of plugs. For example, FIG. 1 shows an evaporator fan 101 including a two-prong plug 105. By comparison, FIG. 3 shows an evaporator fan 201 including a three-prong plug 205. Advantageously, the universal connector disclosed herein is preferably configured to be connected with a selected one of a plurality of evaporator fan plugs/connectors having different configurations. For example, the universal connector may be configured to be connected with a selected one of a three-prong plug/connector of a first evaporator fan and a two-prong plug/connector of a second evaporator fan, thereby allowing the three-prong plug/connector or the two-prong plug/connector to be plugged into the universal connector for connecting the respective first or second evaporator fan to the AC voltage source.

Figure 2:
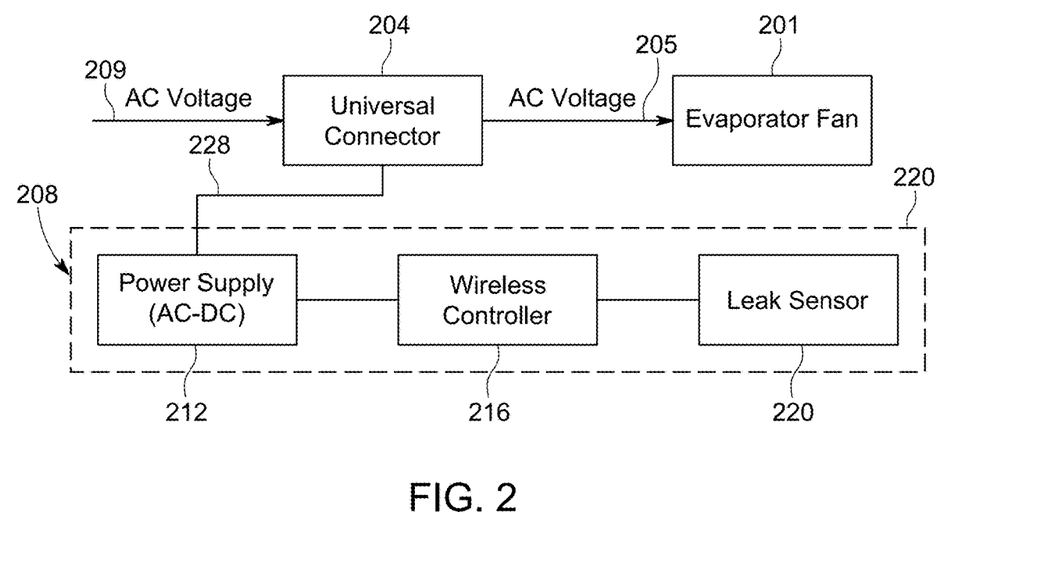
FIG. 2 is a block diagram illustrating a universal connector and leak sensor module retrofit or added to a refrigerated case to provide fan control during leak testing according to an exemplary embodiment of the present disclosure.

FIG. 2 illustrates a universal connector 204 and leak sensor module 208 retrofit or added to a refrigerated case to provide fan control during leak testing according to an exemplary embodiment of the present disclosure. The universal connector 204 is configured to interrupt the fan power in the refrigerated case thereby enabling a user to controllably turn OFF the evaporator fan 201 when there is a need to check for a refrigerant leak in a refrigerated case, including both Low Temp (LT) refrigerated cases and Medium Temp (LT) refrigerated cases.

The universal connector 204 is configured to be coupled with a leak sensor module or device 208. The leak sensor module 208 is configured to be operable for sensing refrigerant leaks in a refrigerated case. In this exemplary embodiment, the leak sensor module 208 includes a power supply (AC-DC) 212, a wireless controller 216, and a leak sensor or sensor unit 220. The leak sensor module 208 includes a single device enclosure or housing 220 defining an interior in which are collectively positioned the power supply (AC/DC) 212, wireless controller 216, and leak sensor 220. A cord 228 extends from the single device enclosure 220 for connection with the universal connector 204 at its opposite end. The leak sensor module 208 may include a switch (e.g., relay, a solid state switch, etc.) for activating the leak sensor module 208 to conduct leak testing.

The universal connector 204 is configured to safely create a junction for the wireless controller 216 to turn ON/OFF the evaporator fan 201 as needed. The universal connector 204 enables a quick install of the refrigerant leak sensor module 208 wherever a refrigerant technician determines the refrigerant leak sensor 220 is needed, e.g., near an evaporator of the refrigerated case, etc.

The wireless controller 216 is usable by the refrigeration technician to controllably turn OFF/ON the evaporator fan 201 as needed while using the refrigerant leak sensor 220 to check for a refrigerant leak in the refrigerated case. The leak sensor module 208 may be placed or located at or adjacent a bottom of the refrigeration case at which leaking refrigerant may accumulate due to the refrigerant being denser than air when the evaporator fan 201 is turned off. The leak sensor module 208 is preferably located where there should be a higher concentration of refrigerant in static environment in the presence of a leak despite the rules of gas dilution.

The power supply (AC/DC) 212 is configured to receive power from the AC voltage source 209 through the universal connector 204. The AC voltage would otherwise be supplied to the evaporator fan 201 for operation if not interrupted and diverted by the universal connector 204 to the power supply (AC/DC) 212.

The power supply (AC/DC) 212 comprises an AC to DC converter that is operable for converting the AC voltage to DC voltage. The AC/DC converter is coupled with the wireless controller 216 and leak sensor 220 for providing the converted DC voltage for operation of the wireless controller 216 and the leak sensor 220 during leak testing.

The leak sensor 220 may comprise an integrated circuit, other electronic sensor, etc. The leak sensor 220 may be configured to be operable for sensing A1 refrigerant and/or A2L refrigerant.

The wireless controller 216 may include a processor (e.g., microprocessor, etc.) that receives the DC power from the power supply (AC/DC) 212. The wireless controller 216 may be configured to obtain power from an alternate power source (e.g., capacitor, battery, shunting from the AC voltage source 209, etc.) during leak testing if AC voltage to the wireless controller 216 is cut. For example, the leak sensor module 208 may include a battery for use when the circulation fan stops such as during defrost, etc.

The wireless controller 216 may be configured to communicate the results of a leakage test wirelessly to a remote receiver. The remote receiver may be a standalone device configured to communicate information from one or more leak sensors or detectors, e.g., via BACnet or Modbus data communications protocol, etc. to a gateway, etc. The leak sensor module 208 may be configured to be operable for feeding sensor information to the cloud via a gateway. Or the remote receiver may be a refrigerated case controller, which is configured to send leakage information out over its own network.

The leak sensor 220 may include onboard communications for passing data to the wireless controller 216. But the leak sensor 220 does not necessarily include or require additional onboard communications for communicating with a gateway or the cloud.

FIG. 3 shows the universal connector 204 being retrofit or added to a refrigerated case to provide fan control according to an exemplary embodiment of the present disclosure. The device or leak sensor module 208 is plugged into or otherwise coupled (e.g., via a hardwired connection, etc.) with the universal connector 204.

As shown in FIG. 3, a conventional three-prong plug/connector 205 of the evaporator fan(s) 201 may be plugged into and connected with the universal connector 204. Although FIG. 3 shows a conventional three-prong plug/connector 205 of the evaporator fan(s) 201 being plugged into the universal connector 204, the universal connector 204 is also usable with other evaporator fan plug/connector configurations, such as the conventional two-prong plug/connector 105 of the evaporator fan 102 shown in FIG. 1.

The leak sensor module 208 including its leak sensor 220 (FIG. 220) may be placed at a location as determined by a refrigerant technician to check for a refrigerant leak in a refrigerated case, including both Low Temp (LT) refrigerated cases and Medium Temp (LT) refrigerated cases. For example, the leak sensor module 208 may be placed or located at or adjacent a bottom of the refrigeration case at which leaking refrigerant may accumulate due to the refrigerant being denser than air when the evaporator fan 201 is turned off. The leak sensor module 208 is preferably located where there should be a higher concentration of refrigerant in static environment in the presence of a leak despite the rules of gas dilution.

Disclosed herein are exemplary embodiments of refrigerant sensing systems for refrigerated display cases. In exemplary embodiments, the refrigerant sensing system is configured to be powered by connection to the fan in the refrigerated display case. The refrigerant sensing system is configured to be plugged (e.g., via a universal connector, etc.) into the plug that would otherwise receive the circulation fan plug (e.g., 105 in FIG. 1, 205 in FIG. 3, etc.). And the circulation fan plug is plugged into the refrigerant sensing system. The refrigerant sensing system may comprise a standalone system that is retrofittable to an existing refrigerated case. In some exemplary embodiments, the refrigerant sensing system may be configured with the capability for off radio transmission of a leak to a central or local panel.

Disclosed herein are exemplary embodiments of refrigerant leak detection systems for refrigerated cases including evaporators fan for blowing air across coils of evaporators. In exemplary embodiments, the system includes a leak sensor module for sensing leaked refrigerant and a universal connector. The universal connector is configured as a junction for connecting an AC voltage source with the evaporator fan and the leak sensor module. The universal connector is configured to be operable for selectively supplying AC voltage from the AC voltage source to the evaporator fan, or to the leak sensor module, or to both the evaporator fan and the leak sensor module. The system is configured such that when the leak sensor module is activated to conduct leak testing, the AC voltage from the AC voltage source to the evaporator fan is interrupted by the universal connector to thereby turn OFF the evaporator fan and facilitate detection of any leaked refrigerant.

In exemplary embodiments, the universal connector is configured to be connected with a selected one of a plurality of evaporator fan plugs/connectors having different configurations. For example, the universal connector may be configured to be connected with a selected one of a three-prong plug/connector of a first evaporator fan and a two-prong plug/connector of a second evaporator fan, thereby allowing the three-prong plug/connector or the two-prong plug/connector to be plugged into the universal connector for connecting the respective first or second evaporator fan to the AC voltage source.

In exemplary embodiments, the leak sensor module comprises an integrated circuit configured to be operable for sensing leaked refrigerant.

In exemplary embodiments, the leak sensor module comprises a controller configured to be operable for wirelessly communicating sensor data.

In exemplary embodiments, the leak sensor module comprises an AC/DC converter, a controller, and a leak sensor. The AC/DC converter is configured to be coupled with the universal connector for receiving AC voltage from the AC voltage source via the universal connector that is operable for interrupting the AC voltage to the evaporator fan and diverting the AC voltage to the leak sensor module. And the AC/DC converter is further configured to be operable for converting the AC voltage received via the universal connector to DC voltage, which DC voltage is supplied to the controller and the leak sensor of the leak sensor module. The leak sensor module may comprise a single enclosure or housing defining an interior in which are collectively positioned the AC/DC converter, the controller, and the leak sensor. The leak sensor module may include a cord extending from the single enclosure for connection with the universal connector thereby enabling the AC voltage from the AC voltage source to be supplied through the universal connector along the cord to the AC/DC converter.

In exemplary embodiments, the system is configured such that during leak testing if AC voltage to a controller of the leak sensor module is cut, the controller is obtains power from an alternate power source, such as a capacitor, battery, shunting from the AC voltage source, etc.

In exemplary embodiments, the leak sensor module includes a switch, such as a relay or a solid state switch, for activating the leak sensor module to conduct leak testing.

In exemplary embodiments, a refrigerated case includes an evaporator having coils, an evaporator fan for blowing air across the coils of the evaporator, and a refrigerant leak detection system as disclosed herein.

Also disclosed are exemplary methods of retrofitting or providing a refrigerated case with evaporator fan control. In exemplary embodiments, the method comprises connecting a universal connector with an AC voltage source and an evaporator fan of the refrigerator case, such that the universal connector is positioned and/or intervenes between the AC voltage source and the evaporator fan. The method also includes connecting a leak sensor module with the universal connector. The universal connector is operable for selectively supplying AC voltage from the AC voltage source to the evaporator fan, or to the leak sensor module, or to both the evaporator fan and the leak sensor module. When the leak sensor module is activated to conduct leak testing, the AC voltage from the AC voltage source to the evaporator fan is interrupted by the universal connector to thereby turn OFF the evaporator fan and facilitate detection of any leaked refrigerant.

In exemplary embodiments, the universal connector is configured to be connected with a selected one of a plurality of evaporator fan plugs/connectors having different configurations. And the method includes plugging the selected one of the plurality of evaporator fan plugs/connectors having different configurations into the universal connector. For example, the universal connector may be configured to be connected with a selected one of a three-prong plug/connector of a first evaporator fan and a two-prong plug/connector of a second evaporator fan. And the method may include plugging the selected one of the three-prong plug/connector or the two-prong plug/connector into the universal connector to thereby connect the respective first or second evaporator fan to the AC voltage source.

In exemplary embodiments, the leak sensor module comprises an integrated circuit configured to be operable for sensing leaked refrigerant; and/or a controller configured to be operable for wirelessly communicating sensor data.

In exemplary embodiments, the leak sensor module comprises an AC/DC converter, a controller, and a leak sensor. The AC/DC converter is configured to be coupled with the universal connector for receiving AC voltage from the AC voltage source via the universal connector that is operable for interrupting the AC voltage to the evaporator fan and diverting the AC voltage to the leak sensor module. And the AC/DC converter is further configured to be operable for converting the AC voltage received via the universal connector to DC voltage, which DC voltage is supplied to the controller and the leak sensor of the leak sensor module. The leak sensor module may comprise a single enclosure or housing defining an interior in which are collectively positioned the AC/DC converter, the controller, and the leak sensor. The leak sensor module may include a cord extending from the single enclosure for connection with the universal connector. And the method may include connecting the cord with the universal connector to thereby enable the AC voltage from the AC voltage source to be supplied through the universal connector along the cord to the AC/DC converter.

In exemplary embodiments, the method includes providing an alternate power source for a controller of the leak sensor module such that the controller will obtain power from the alternate power source (e.g., capacitor, battery, shunting from the AC voltage source, etc.) during leak testing if AC voltage to the controller is cut, e.g., when the circulation fan stops such as during defrost, etc.

In exemplary embodiments, the method includes providing a switch for activating the leak sensor module to conduct leak testing.

Also disclosed are exemplary methods relating to refrigerant leak detection in a refrigerated case. In exemplary embodiments, the method comprises: activating a leak sensor module to conduct leak testing; interrupting, via a universal connector, AC voltage from an AC voltage source to an evaporator fan to thereby turn OFF the evaporator fan and facilitate detection of any leaked refrigerant; and providing AC voltage from the AC voltage source through the universal connector to the leak sensor module.

In exemplary embodiments, the universal connector is configured to be connected with a selected one of a plurality of evaporator fan plugs/connectors having different configurations. And the method includes plugging the selected one of the plurality of evaporator fan plugs/connectors having different configurations into the universal connector. For example, the universal connector may be configured to be connected with a selected one of a three-prong plug/connector of a first evaporator fan and a two-prong plug/connector of a second evaporator fan. And the method may include plugging the selected one of the three-prong plug/connector or the two-prong plug/connector into the universal connector to thereby connect the respective first or second evaporator fan to the AC voltage source.

In exemplary embodiments, the method includes: converting the AC voltage received via the universal connector to DC voltage; and supplying the DC voltage to a controller and a leak sensor of the leak sensor module.

In exemplary embodiments, the method including using an integrated circuit of the leak sensor module for sensing leaked refrigerant.

In exemplary embodiments, the method includes wirelessly communicating sensor data from the leak sensor module to a remote device or system.

In exemplary embodiments, the leak sensor module comprises an AC/DC converter, a controller, a leak sensor, and a single enclosure or housing defining an interior in which are collectively positioned the AC/DC converter, the controller, and the leak sensor. The leak sensor module may include a cord extending from the single enclosure for connection with the universal connector. And the method may include connecting the cord with the universal connector to thereby enable the AC voltage from the AC voltage source to be supplied through the universal connector along the cord to the AC/DC converter.

In exemplary embodiments, the method includes providing an alternate power source (e.g., capacitor, battery, shunting from the AC voltage source, etc.) for a controller of the leak sensor module such that the controller will obtain power from the alternate power source during leak testing if AC voltage to the controller is cut, e.g., when the circulation fan stops such as during defrost, etc.

In exemplary embodiments, the method includes using a switch (e.g., relay, solid state switch, etc.) for activating the leak sensor module to conduct leak testing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refrigerant leak detection system for a refrigerated case including an evaporator fan for blowing air across coils of an evaporator, the system comprising:
    a leak sensor module for sensing leaked refrigerant; and
    a universal connector compatible with multiple fan plug types and configured as a junction for connecting an AC voltage source with the evaporator fan and the leak sensor module, the universal connector configured to be operable for selectively supplying AC voltage from the AC voltage source to the evaporator fan, or to the leak sensor module, or to both the evaporator fan and the leak sensor module; and
    wherein the system is configured such that when the leak sensor module is activated to conduct leak testing, the AC voltage from the AC voltage source to the evaporator fan is interrupted by the universal connector to thereby turn OFF the evaporator fan and facilitate detection of any leaked refrigerant.

2. The system of claim 1, wherein the universal connector is a retrofit universal connector configured to be connected with a selected one of a plurality of evaporator fan plugs/connectors having different configurations and to selectively interrupt the AC voltage to the evaporator fan to thereby turn OFF the evaporator fan during leak testing.

3. The system of claim 1, wherein the universal connector is configured to be connected with a selected one of a three-prong plug/connector of a first evaporator fan and a two-prong plug/connector of a second evaporator fan, thereby allowing the three-prong plug/connector or the two-prong plug/connector to be plugged into the universal connector for connecting the respective first or second evaporator fan to the AC voltage source.

4. The system of claim 1, wherein the leak sensor module comprises an integrated circuit configured to be operable for sensing leaked refrigerant.

5. The system of claim 1, wherein the leak sensor module comprises a controller configured to be operable for wirelessly communicating sensor data.

6. The system of claim 1, wherein:
    the leak sensor module comprises an AC/DC converter, a controller, and a leak sensor;
    the AC/DC converter is configured to be coupled with the universal connector for receiving AC voltage from the AC voltage source via the universal connector that is operable for interrupting the AC voltage to the evaporator fan and diverting the AC voltage to the leak sensor module; and
    the AC/DC converter is further configured to be operable for converting the AC voltage received via the universal connector to DC voltage, which DC voltage is supplied to the controller and the leak sensor of the leak sensor module.

7. The system of claim 6, wherein the leak sensor module comprises a single enclosure or housing defining an interior in which are collectively positioned the AC/DC converter, the controller, and the leak sensor.

8. The system of claim 7, wherein the leak sensor module includes a cord extending from the single enclosure for connection with the universal connector thereby enabling the AC voltage from the AC voltage source to be supplied through the universal connector along the cord to the AC/DC converter.

9. The system of claim 1, wherein the system is configured such that during leak testing if AC voltage to a controller of the leak sensor module is cut, the controller will obtain power from an alternate power source.

10. The system of claim 1, wherein the leak sensor module includes a switch for activating the leak sensor module to conduct leak testing.

11. A refrigerated case including an evaporator having coils, an evaporator fan for blowing air across the coils of the evaporator, and the refrigerant leak detection system of claim 1.

12. A method of retrofitting or providing a refrigerated case with evaporator fan control, the method comprising:
    connecting a universal connector with an AC voltage source and an evaporator fan of the refrigerator case, such that the universal connector is positioned and/or intervenes between the AC voltage source and the evaporator fan, the universal connector is compatible with multiple fan plug types; and
    connecting a leak sensor module with the universal connector;
    whereby the universal connector is operable for selectively supplying AC voltage from the AC voltage source to the evaporator fan, or to the leak sensor module, or to both the evaporator fan and the leak sensor module; and
    whereby when the leak sensor module is activated to conduct leak testing, the AC voltage from the AC voltage source to the evaporator fan is interrupted by the universal connector to thereby turn OFF the evaporator fan and facilitate detection of any leaked refrigerant.

13. The method of claim 12, wherein:
    the universal connector is a retrofit universal connector configured to be connected with a selected one of a plurality of evaporator fan plugs/connectors having different configurations and to selectively interrupt the AC voltage to the evaporator fan to thereby turn OFF the evaporator fan during leak testing; and
    the method includes plugging the selected one of the plurality of evaporator fan plugs/connectors having different configurations into the universal connector.

14. The method of claim 12, wherein:
    the universal connector is configured to be connected with a selected one of a three-prong plug/connector of a first evaporator fan and a two-prong plug/connector of a second evaporator fan; and
    the method includes plugging the selected one of the three-prong plug/connector or the two-prong plug/connector into the universal connector to thereby connect the respective first or second evaporator fan to the AC voltage source.

15. The method of claim 12, wherein the leak sensor module comprises:
   an integrated circuit configured to be operable for sensing leaked refrigerant; and/or
   a controller configured to be operable for wirelessly communicating sensor data.

16. The method of claim 12, wherein:
   the leak sensor module comprises an AC/DC converter, a controller, and a leak sensor;
   the AC/DC converter is configured to be coupled with the universal connector for receiving AC voltage from the AC voltage source via the universal connector that is operable for interrupting the AC voltage to the evaporator fan and diverting the AC voltage to the leak sensor module; and
   the AC/DC converter is further configured to be operable for converting the AC voltage received via the universal connector to DC voltage, which DC voltage is supplied to the controller and the leak sensor of the leak sensor module.

17. The method of claim 16, wherein the leak sensor module comprises a single enclosure or housing defining an interior in which are collectively positioned the AC/DC converter, the controller, and the leak sensor.

18. The method of claim 17, wherein:
   the leak sensor module includes a cord extending from the single enclosure for connection with the universal connector; and
   the method includes connecting the cord with the universal connector to thereby enable the AC voltage from the AC voltage source to be supplied through the universal connector along the cord to the AC/DC converter.

19. The method of claim 12, wherein the method includes providing an alternate power source for a controller of the leak sensor module such that the controller will obtain power from the alternate power source during leak testing if AC voltage to the controller is cut.

20. The method of claim 12, wherein the method includes providing a switch for activating the leak sensor module to conduct leak testing.

21. A method relating to refrigerant leak detection in a refrigerated case, the method comprising:
   activating a leak sensor module to conduct leak testing;
   interrupting, via a universal connector, AC voltage from an AC voltage source to an evaporator fan to thereby turn OFF the evaporator fan and facilitate detection of any leaked refrigerant, the universal connector is compatible with multiple fan plug types; and
   providing AC voltage from the AC voltage source through the universal connector to the leak sensor module.

22. The method of claim 21, wherein:
   the universal connector is a retrofit universal connector configured to be connected with a selected one of a plurality of evaporator fan plugs/connectors having different configurations and to selectively interrupt the AC voltage to the evaporator fan to thereby turn OFF the evaporator fan during leak testing; and
   the method includes plugging the selected one of the plurality of evaporator fan plugs/connectors having different configurations into the universal connector.

23. The method of claim 21, wherein:
   the universal connector is configured to be connected with a selected one of a three-prong plug/connector of a first evaporator fan and a two-prong plug/connector of a second evaporator fan; and
   the method includes plugging the selected one of the three-prong plug/connector or the two-prong plug/connector into the universal connector to thereby connect the respective first or second evaporator fan to the AC voltage source.

24. The method of claim 21, wherein the method includes:
   converting the AC voltage received via the universal connector to DC voltage; and
   supplying the DC voltage to a controller and a leak sensor of the leak sensor module.

25. The method of claim 21, wherein the method including using an integrated circuit of the leak sensor module for sensing leaked refrigerant.

26. The method of claim 21, wherein the method includes wirelessly communicating sensor data from the leak sensor module to a remote device or system.

27. The method of claim 21, wherein the leak sensor module comprises an AC/DC converter, a controller, a leak sensor, and a single enclosure or housing defining an interior in which are collectively positioned the AC/DC converter, the controller, and the leak sensor.

28. The method of claim 27, wherein:
   the leak sensor module includes a cord extending from the single enclosure for connection with the universal connector; and
   the method includes connecting the cord with the universal connector to thereby enable the AC voltage from the AC voltage source to be supplied through the universal connector along the cord to the AC/DC converter.

29. The method of claim 21, wherein the method includes providing an alternate power source for a controller of the leak sensor module such that the controller will obtain power from the alternate power source during leak testing if AC voltage to the controller is cut.

30. The method of claim 21, wherein the method includes using a switch for activating the leak sensor module to conduct leak testing.

* * * * *